May 25, 1926.
C. P. ASTROM
1,586,393
HEAD GATE HOIST MECHANISM
Original Filed Feb. 10, 1923    2 Sheets-Sheet 1
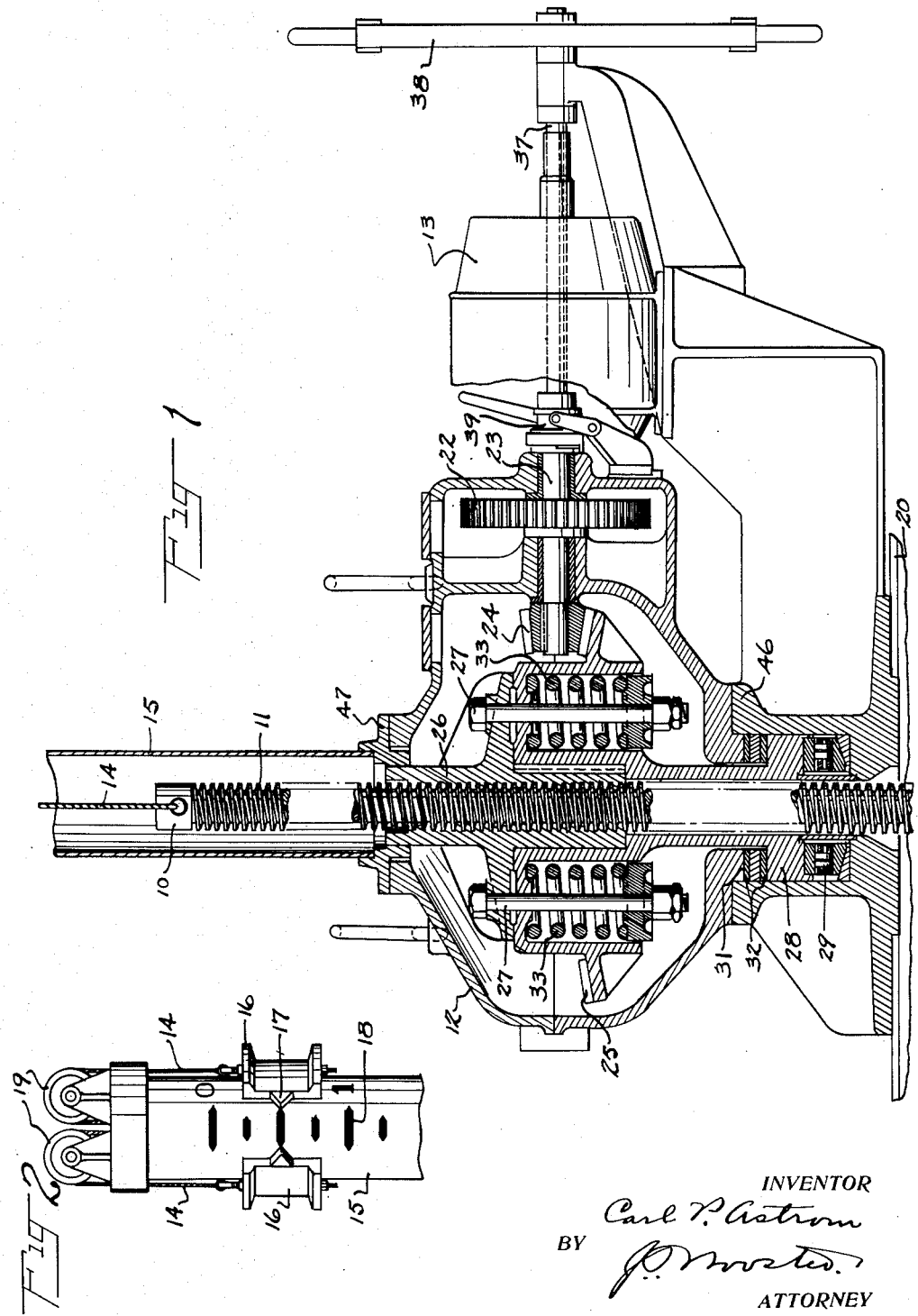
INVENTOR
Carl P. Astrom
BY
ATTORNEY

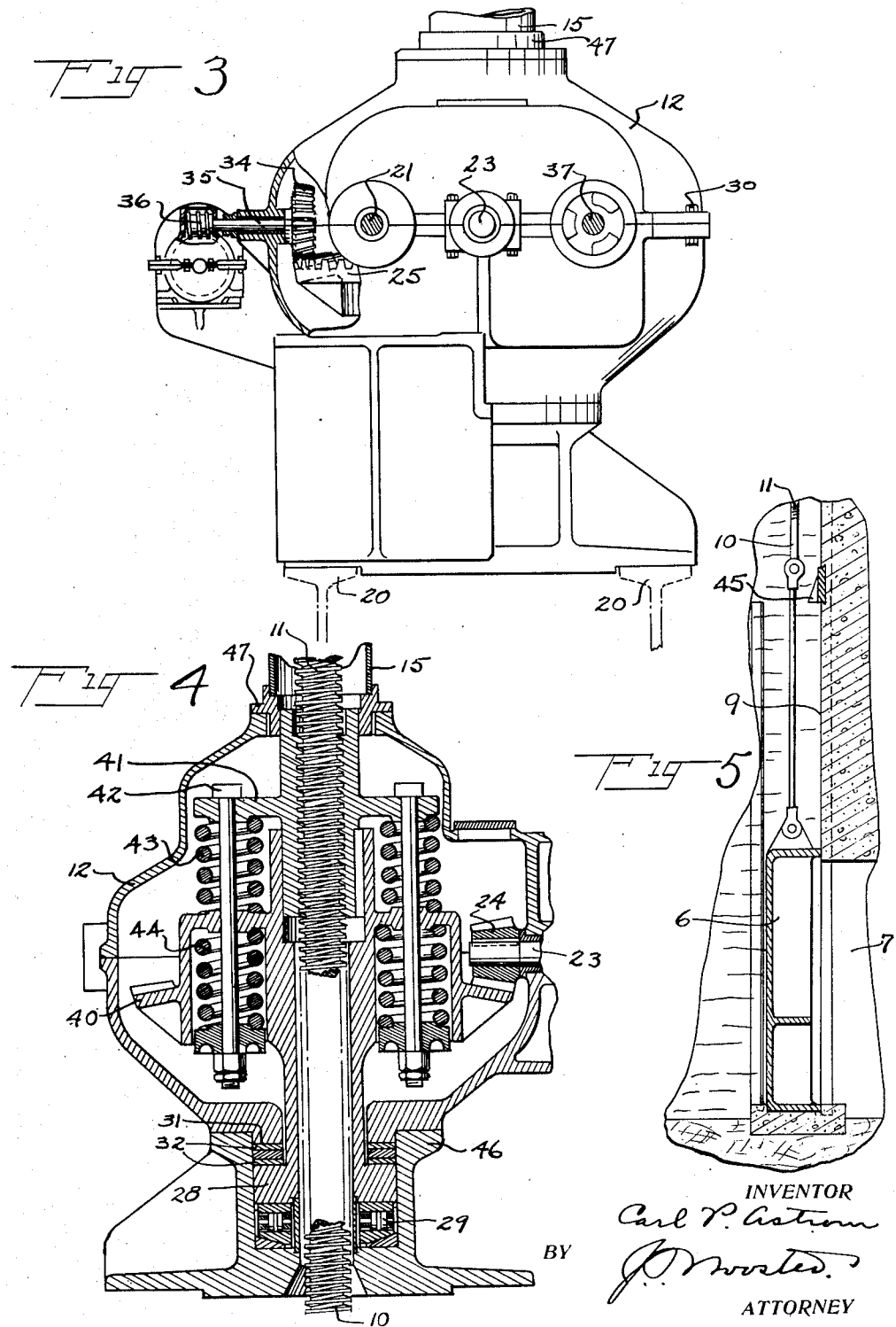

Patented May 25, 1926.

1,586,393

UNITED STATES PATENT OFFICE.

CARL P. ASTROM, OF EAST ORANGE, NEW JERSEY, ASSIGNOR TO M. H. TREADWELL COMPANY, OF NEW YORK, N. Y., A CORPORATION OF NEW YORK.

HEAD-GATE HOIST MECHANISM.

Application filed February 10, 1923, Serial No. 618,211. Renewed March 12, 1926.

This invention relates to shock absorbing means for electrically operated penstock head gates, wherein over-running of the motor, as from failure of a limit switch, will not damage the mechanism. This may happen because the travel of the gate is positively limited and it becomes desirable to absorb such shocks in the driver without damage.

According to this invention, the head gate is actuated by means of a long rod threaded at its upper portion where a motor driven nut engages the rod to raise or lower it. Means are provided for yieldably stopping the motor when the gate reaches the end of its travel, or may become jammed anywhere in its travel. The yielding stopping of the motor prevents any rupture of parts or stripping of gears as might occur through an abrupt stopping of the gate without any means for taking up the inertia of the moving parts.

Referring to the drawings:

Figure 1 is a section showing the construction of the yieldable connection.

Fig. 2 shows the pointer for indicating the position of the gate.

Fig. 3 shows a right end view of the construction of Fig. 1.

Fig. 4 is a section through another embodiment of this invention.

Fig. 5 shows the head gate in closed position.

Numeral 6 indicates the head gate suspended on the actuating bar 10, which controls the position of the gate in its movement up and down along the wall 9 to open or close the penstock, or other passageway 7. The bar 10 is provided at its upper portion with screw threads 11. Located within the housing 12 is the yieldable driving connection for moving the bar 10, which is driven by the electric motor 13. The motor and transmission mechanism may be located on the ground, or at any other desired level. Attached on the top of the bar 10 are the cables 14 passing up through tube 15 and over the pulleys 19 on the top thereof, and provided with counterweights 16, which have the pointers 17 thereon for indicating the location of the gate on the scale 18 shown in Fig. 2.

The motor and transmission mechanism are mounted on any prepared foundation, such as the I-beam supports 20, for example.

The motor shaft 21 is provided with a small gear meshing with the larger pinion 22 on the shaft 23, and the smaller bevelled gear 24 on this shaft drives the larger gear 25 so that the speed of the motor is greatly reduced in being transmitted. An internally threaded nut 26 for moving the gate bar 10 is prevented from rotation relative to the gear 25 by means of the bolts 27 passing through both these members. At the bottom of the gear 25 is a supporting flange 28 which turns on the roller bearings 29, the gear 25 thus functions as a thrust member to support the weight of the nut and bar. The various parts of the casing 12 are secured together by bolts 30 and the casing in turn is also bolted to the foundation casting 46. The lower end of the casing 12 is provided with a down turned flange 31 provided at its lower end with bronze bearing rings 32 cooperating with the top of the flange 28. Secured between the nut 26 and the gear 25 are the yieldable means or springs 33, which in normal position are arranged as shown in Fig. 1. The springs 33 functionally engage the nut 26, since the bolts 27 may be regarded as projections of the nut. Also in cooperation with the gear 25 is the driven gear 34 on the shaft 35 driving the worm 36 which controls the limit switch for the motor circuit, and opens the circuit after the gate bar 10 has moved a predetermined distance. In order to safeguard the moving parts against jamming when the gate bar 10 reaches the end of its travel, or before, this yieldable connection is provided and enables a limited rotation of the motor and parts without any corresponding movement of the bar 10. Continued rotation of the gear 25, after the bar 10 has stopped, results in the nut 26 being rotated by the bar a limited distance under the compression of the springs 33, which when compressed tend to keep the gate firmly closed and transmit an upward thrust to the flange 28 and the bearing 32. The nut 26 is guided in its movement by means of the bearing 47 at the upper end thereof. A thrust means, such as the thrust member 25, or its cooperating bearings, transmits the thrust of the nut and springs to the casing or foundation.

A hand wheel 38 mounted on a shaft 37 cooperates with a small gear engaging the larger gear 22 and is controlled by the clutch 39 so that the gate may be moved when the motor is unable to function. Or, if strong springs are used, the mechanically operated limit switch might be eliminated, when the increased effort to compress the springs 33 would be sufficient to open the circuit breaker or fuse on the motor 13. A polyphase induction motor is preferably used, but any other convenient form of electric or other motor may also be used.

In the embodiment shown in Fig. 4, the housing 12 is shaped somewhat similarly and the bevelled gear 24 of the shaft 23 drives the thrust member or gear 40, which differs from the gear 25 in the manner indicated on the drawing, but is provided at its lower end with the same type of flange 28 with bearings 29 and 32. The bolts 42 prevent relative rotation between the driving nut 41 and the gear 40. The provision of two sets of springs 43 and 44 enables the driving mechanism to have a limited rotation beyond the end of travel of the gate in either direction or when it jams in any part of its travel. For limiting the upward movement of the gate a stop 45 is provided. A limited rotation of the driving mechanism is also possible after the bar 10 has reached its uppermost position since the collar 41 is able to move down the threaded bar for a limited distance under the compression of the springs 43. A bearing 47 is also provided for guiding the driving nut 41.

Among the advantages of this invention may be enumerated the increased safety to moving parts and their freedom from liability to rupture on sudden stopping. In case the limit switch be set to operate at a slightly different position from the closure of the gate, the yieldable connection of this invention affords the moving parts a limited rotation beyond that point. Springs contained in the yieldable connection also tend to hold the gate firmly closed. In case of accidental jamming of the gate, the motor is yieldingly stopped without breakage of any parts.

I claim:

1. The combination with a threaded gate-actuating bar, of a driving nut threaded on said bar, means for rotating said nut, including longitudinally fixed thrust means for said nut, and yieldable means between said nut and thrust means permitting limited relative longitudinal movement of said nut on obstruction of said bar.

2. The combination in a gate-operating mechanism with a threaded actuating bar, of a driving nut threaded on said bar, means for rotating said nut, a thrust member rotatable with said nut and means to prevent longitudinal movement of said thrust member, and yieldable means between said nut and thrust member permitting limited relative longitudinal movement.

3. The combination in a gate-operating mechanism with a threaded actuating bar, of a driving nut threaded on said bar, a driving gear for said nut, means to prevent longitudinal movement of said gear in either direction, and means between said nut and gear securing them against relative rotation but permitting limited relative longitudinal movement.

4. The combination in a gate-operating mechanism with a threaded actuating bar, of a driving nut threaded on said bar, a casing around said nut, means for rotating said nut, including a thrust member rotatable with said nut and means to prevent longitudinal movement of said thrust member, yieldable means between said nut and thrust member permitting limited relative longitudinal movement, and a projection on said nut engaging said casing to guide the longitudinal movement of said nut.

5. The combination with a threaded gate-actuating bar, of a driving nut threaded on said bar, means for rotating said nut, including longitudinally fixed thrust means for said nut, and a plurality of springs between said nut and thrust means permitting limited relative longitudinal movement of said nut in either direction on obstruction of said bar.

6. The combination with a gate-actuating member of driving means for said member, and yieldable means between said member and driving means for allowing limited movement of the driving means after said member has been obstructed while moving in either direction in any portion of its travel.

7. The combination in a gate-operating mechanism with a threaded actuating bar, of a driving nut threaded on said bar, a driving gear for said nut, a casing around said nut, means on said gear engaging said casing to prevent longitudinal movement of the gear in either direction, means engaging said nut and gear and securing them against relative rotation, a spring between said gear and nut permitting limited relative longitudinal movement with increasing affort under compression of said spring, and a guide bearing on said casing for said nut.

Signed at New York city in the county of New York and State of New York this 9th day of Feb., A. D., 1923.

CARL P. ASTROM.